United States Patent
Gupta et al.

(10) Patent No.: US 12,381,830 B2
(45) Date of Patent: *Aug. 5, 2025

(54) EFFICIENT TLV STYLE HEADER PARSING AND EDITING

(71) Applicant: Avago Technologies International Sales Pte. Limited, Singapore (SG)

(72) Inventors: Amit Narayan Gupta, San Jose, CA (US); Bhaswar Mitra, Santa Clara, CA (US); Chi Ho Fredrek Choi, Sunnyvale, CA (US); Arun Prasath Chandrasekaran, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,006

(22) Filed: Aug. 2, 2023

(65) Prior Publication Data

US 2023/0411703 A1    Dec. 21, 2023

Related U.S. Application Data

(63) Continuation of application No. 17/587,660, filed on Jan. 28, 2022, now Pat. No. 11,758,027.

(51) Int. Cl.
*H04L 12/28* (2006.01)
*H04L 47/34* (2022.01)

(52) U.S. Cl.
CPC .................... *H04L 47/34* (2013.01)

(58) Field of Classification Search
CPC ... H04L 69/22; H04L 45/74591; H04L 47/10; H04L 47/24; H04L 47/2408; H04L 47/2425; H04L 47/2441; H04L 47/2483; H04L 47/2491; H04L 47/34; H04L 47/35; H04L 49/3009

See application file for complete search history.

(56) References Cited

U.S. PATENT DOCUMENTS

| | | | |
|---|---|---|---|
| 9,531,986 B2 | 12/2016 | Cho et al. | |
| 10,701,190 B2 | 6/2020 | Kfir et al. | |
| 2007/0286066 A1* | 12/2007 | Zhang | H04W 72/23 370/208 |

(Continued)

FOREIGN PATENT DOCUMENTS

| | | |
|---|---|---|
| CN | 107707548 A | 2/2018 |
| WO | WO-2008/140817 A2 | 11/2008 |
| WO | WO-2021/083341 A1 | 1/2021 |

OTHER PUBLICATIONS

Notice of Allowance on U.S. Appl. No. 17/587,660 Dtd May 10, 2023.
Partial European Search Report EP 22216721.5 dated Jun. 5, 2023.

*Primary Examiner* — Elisabeth Benoit Magloire
(74) *Attorney, Agent, or Firm* — Foley & Lardner LLP

(57) ABSTRACT

In some aspects, the disclosure is directed to methods and systems for a flexible type-length-value (TLV) parser and identification map that may be used to quickly identify TLV sequences of packet headers for subsequent processing in a pipeline. A flexible TLV bus may provide a secondary path for the TLV header and identification map, allowing for subsequent processing stages to read, process, modify, delete, or otherwise utilize individual TLV sequences within the header.

20 Claims, 8 Drawing Sheets

(56) References Cited

U.S. PATENT DOCUMENTS

| | | | |
|---|---|---|---|
| 2009/0310543 A1* | 12/2009 | Kim | H04L 5/0007 |
| | | | 370/329 |
| 2009/0327547 A1* | 12/2009 | Cho | H04L 12/2836 |
| | | | 710/106 |
| 2009/0327572 A1* | 12/2009 | Cho | G06F 13/4291 |
| | | | 711/E12.082 |
| 2010/0118772 A1* | 5/2010 | Cheng | H04W 72/23 |
| | | | 375/267 |
| 2011/0019622 A1* | 1/2011 | Lee | H04L 5/0007 |
| | | | 370/328 |
| 2012/0036507 A1* | 2/2012 | Jonnala | H04L 67/34 |
| | | | 717/174 |
| 2014/0016453 A1* | 1/2014 | Mehta | H04L 43/10 |
| | | | 370/242 |
| 2019/0215384 A1 | 7/2019 | Kfir et al. | |
| 2021/0007039 A1* | 1/2021 | Salahuddeen | H04L 12/1845 |
| 2022/0255845 A1* | 8/2022 | Khera | H04L 45/42 |
| 2022/0255857 A1 | 8/2022 | Li et al. | |

\* cited by examiner

EFFICIENT TLV STYLE HEADER PARSING AND EDITING

CROSS-REFERENCE TO RELATED APPLICATION

This patent application is a continuation of, and claims priority to and the benefit of U.S. patent application Ser. No. 17/587,660, titled "EFFICIENT TLV STYLE HEADER PARSING AND EDITING," and filed Jan. 28, 2022, the contents of all of which are hereby incorporated herein by reference in its entirety for all purposes.

FIELD OF THE DISCLOSURE

This disclosure generally relates to systems and methods for network packet processing. In particular, this disclosure relates to systems and methods for parsing type-length-value (TLV) headers in network packets.

BACKGROUND OF THE DISCLOSURE

Type-Length-Value (TLV) headers provide flexibility for communications protocols through the inclusion of optional elements within the data stream that do not need to be of fixed length or at predetermined positions. A type code may indicate the type of value, and a length of the value may be encoded in the length field. For example, a voice-over-Internet-Protocol system may communicate with a gateway connected to a traditional or plain old telephone system (POTS), and may transmit a packet with a header including a TLV triple with a type code for a phone number, a length code indicating 10 digits (or 10 digits encoded in binary half-octets, in many implementations), and a value of the phone number to be called. Other systems not configured for such operations may nonetheless properly forward the TLV options, ignoring the value. Other uses include device or network monitoring data and instrumentation, simple remote control, security functions, selective acknowledgements for reliable transport protocols, etc., or any other use where a higher protocol layer payload may not be needed. Because of the encoded length identifier, multiple TLV headers may be concatenated and included in an options field or other portion of the header, and may be extracted, parsed, and utilized by devices as they process and forward the packet flow.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
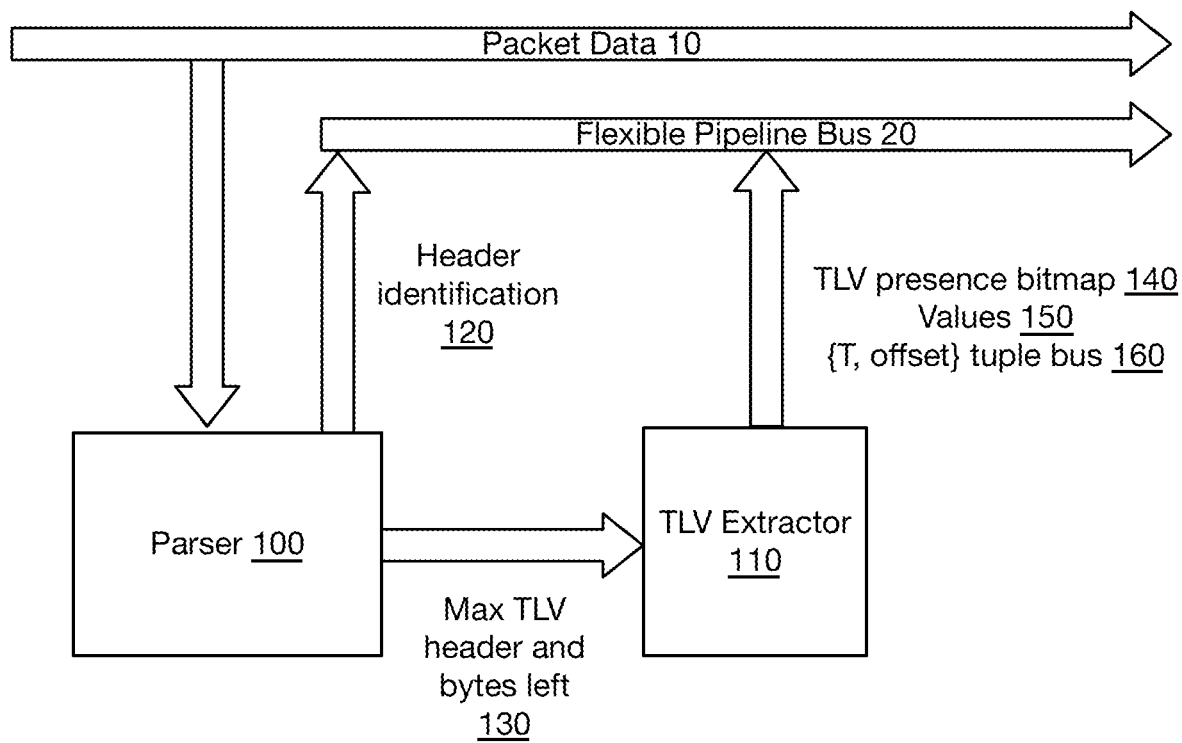
FIG. 1 is a block diagram depicting a parser and a flex TLV extractor circuit, according to some implementations.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11 n™; and IEEE P802.11 ac™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for flex TLV processing; and Section B describes a network environment and computing environment which may be useful for practicing embodiments described herein.

Systems and Methods for Flex TLV Processing

Type-Length-Value (TLV) headers provide flexibility for communications protocols through the inclusion of optional elements within the data stream that do not need to be of fixed length or at predetermined positions. A type code may indicate the type of value, and a length of the value may be encoded in the length field. Because of the encoded length identifier, multiple TLV sequences may be concatenated (referred to collectively or generally as a TLV header) and included in an options field or other portion of the packet header, and may be extracted, parsed, and utilized by devices as they process and forward the packet flow. However, this may present difficulties in identifying and parsing TLV sequences and may typically require each system or circuit processing packets comprising TLV headers to read each TLV sequence in order, resulting in inefficiencies and throughput bottlenecks. For example, in one implementation, a packet processor may be configured to extract a timestamp from a TLV sequence to identify upstream device processing times and overloading. However, the particular TLV sequence including the timestamp may not be the first TLV sequence (beginning at octet 0 of the TLV header) but may be a second or third (or higher) TLV sequence, with an unknown starting position. For example, if the first TLV sequence comprises 32 octets and the second TLV sequence comprises 18 octets, the third may start at octet 50; but if the first sequence comprises 24 octets, the third may start at octet 42. Accordingly, such packet processors may need to read each TLV sequence in order, including irrelevant TLV sequences or sequences not including the desired information, to identify the starting position of the relevant sequence. Worse still, TLV sequence orders and types may not be consistent from packet to packet, even within a single communications flow. For example, a first packet of a flow may include a TLV sequence relating to a beginning transmission time of the sequence, while a second packet of the flow may instead include a TLV sequence relating to memory utilization at the transmitting device. Accordingly, each packet may need to be individually inspected. This may significantly impair throughput, particularly in systems attempting to handle gigabytes or terabytes of data per second.

To address these and other problems, implementations of the systems and methods discussed herein provide a flexible TLV parser and identification map that may be used to quickly identify TLV sequences for subsequent processing in a pipeline. A flexible TLV bus may provide a secondary path for the TLV header and identification map, allowing for subsequent processing stages to read, process, modify, delete, or otherwise utilize individual TLV sequences within the header. Such implementations of a parser and processing pipeline may be able to handle very high throughput, up to several terabytes per second or higher.

Referring first to FIG. 1, illustrated is a block diagram depicting a parser 100 and a flex TLV extractor circuit 110, according to some implementations. Parser 100 may comprise hardware, software, or a combination of hardware and software for receiving and parsing incoming packet data on a packet data bus 10. For example, in many implementations, parser 100 may comprise a packet processing engine or circuit for identifying and parsing a header of an incoming packet (e.g., ASIC, FPGA, or other circuitry for recognizing and interpreting various packet header fields). In many implementations, parser 100 may operate at a low layer of the network stack, such as a data or link layer, network layer, or transport layer (e.g. layer 2, 3, or 4 respectively of the OSI model) and may be configured to extract and/or recognize headers at such low layers of the packet. For example, in many implementations, parser 100 may be configured to copy and/or remove a header encapsulating a higher layer payload. In other implementations, parser 100 may operate at a higher layer of the network stack and may parse and/or remove application layer headers from the incoming packet prior to passing the packet to an application or operating system of a device. For example, in some implementations, parser 100 may be configured to identify a transport layer security (TLS) header encapsulating an application data payload; while in other implementations, parser 100 may be configured to identify a link layer discovery protocol (LLDP) header encapsulating a network layer payload.

Parser 100 may communicate with a TLV extractor 110. In many implementations, TLV extractor 110 may be referred to as a TLV parser, and parser 100 may be referred to as a "standard parser" or non-TLV parser. TLV extractor 110 may comprise hardware, software, or a combination of hardware and software for receiving a TLV header of a packet from parser 100 comprising one or more TLV sequences or entities, and for identifying and extracting each TLV sequence or entity from the TLV header. For example, as shown in the implementation of FIG. 1, parser 100 may receive or retrieve a packet from a packet data bus 10, identify the presence of a TLV header in the packet (e.g. in a data layer header, network layer header, transport layer header, application layer header, or anywhere else in the packet, depending on the implementation); may, in some implementations, place an identification of the presence of the TLV header on a flexible pipeline bus 20 (referred to generally herein as a "flex bus"); and may provide the TLV header (and, in some implementations, an identification of the number of octets in the header) to a TLV extractor 110.

TLV extractor 110 may be configured to read the TLV header 130 and identify or extract each TLV sequence within the header, in many implementations regardless of length or order. TLV extractor 110 may generate a TLV presence bitmap identifying each TLV sequence within the header for subsequent processing, along with a position of the TLV sequence within the header. For example, in some implementations, a TLV header may comprise a first TLV header having type n, length m, and value x; a second TLV header having type n', length m', and value y; a third TLV header having type n", length m", and value z, etc. The TLV extractor 110 may generate a TLV presence bitmap 140 indicating that the TLV header includes a first header of type n, a second header of type n', a third header of type n", etc. For example, the bitmap may comprise a string of {n, n', n", etc.} in some implementations. In other implementations, the bitmap may identify a length for each header and comprise a string of n, m; n', m'; n", m"; etc.).

The length of a TLV sequence may identify the length of the value field for that specific sequence, which may require further calculation to identify a position within the TLV header. For example, in some implementations, a TLV header may include a first TLV sequence with an 8-bit type field, an 8-bit length field, and a 60 byte (480 bit) value field; and a second TLV sequence with an 8-bit type field, an 8-bit length field, and a 32 byte (256 bit) value field; and a third TLV sequence which, accordingly, starts at bit 768 in the header. Rather than requiring later TLV processors to perform this calculation to identify where any particular sequence starts, in some implementations, the TLV extractor 110 may generate a set of tuples for each TLV sequence identifying the offset at which the sequence begins and a sequence identifier and/or type identifier. For example, each tuple may comprise a tuple of {type, offset} for a TLV sequence in some implementations, and the tuple may be placed on the flex bus 20. A subsequent TLV processor that is configured to process TLV data of a certain type (e.g. a TLV processor) may monitor the flex bus for tuples identifying the corresponding type (which may be encoded as a bit string, such as an 8-bit value encoding 256 potential TLV types, or any other such encoding) and the offset within the TLV header. The processor may begin reading the TLV header at the corresponding offset to extract the bitstring corresponding to the sequence.

In a further implementation, the offset for each TLV sequence may be further based on an anchor offset identifying the start of the TLV header. For example, in one implementation, the example TLV header discussed above may comprise an LLDP data unit within an Ethernet frame, starting in some implementations at byte 22 (bit 176) within the frame. This value may be referred to as the anchor offset. In some implementations, the individual TLV sequence offsets may be added to the anchor offset to determine the location of each individual TLV sequence offset within the frame. In some implementations, the anchor offset may be provided separately to the flex bus (e.g., as part of header identification 120 and/or TLV presence bitmap 140), and/or may be added to the offsets for each TLV tuple 160. For example, in some implementations, an anchor offset may indicate that the TLV header begins at byte 22 within the frame, and the TLV tuples may identify TLV sequences starting at bytes 0, 20, and 50 within the TLV header (e.g., byte 22, 42, and 72 within the frame respectively). In many implementations, TLV processing stages in the pipeline do not need to know the anchor offset of the TLV header, and accordingly, the tuples may identify just the offset locations within the TLV header (e.g., 0, 20, and 50 for the example above). In some other implementations, the tuples may identify the combined anchor offset and offset locations (e.g., bytes 22, 42, and 72 for the example above), allowing extraction of specific TLV sequences from the entire packet without separately reading the anchor offset.

Additionally, in many implementations, one or more TLV values 150 may be extracted by TLV extractor 110 and placed on the flex bus for faster processing by downstream TLV processors. For example, in some implementations, a TLV header may include as a value (or as part of a value) a timestamp that may be important for several processing operations (e.g., determining whether a retransmission timeout has occurred, determining whether processing delays have exceeded thresholds, for packet queueing, etc.). In some implementations, such values may be placed in the flex bus 20 by TLV extractor 110, allowing subsequent processing stages to read the values directly without having to first identify the corresponding TLV sequence within the packet header and extract the value.

Although shown as a single block, in many implementations, TLV extractor 110 may comprise a pipeline of successive extractor stages, e.g., for parsing different sequences of the TLV header in parallel. For example, the TLV header may be provided to a first extractor 110, which may identify an offset of a second sequence within the header and forward the preceding bits (e.g. corresponding to the first sequence) to a subsequent TLV extractor stage for parsing (such that the first extractor parses a second TLV sequence while the second extractor parses the first TLV sequence). This may be done iteratively for additional TLV sequences until no further bytes remain in the TLV header (subtracting the number of bits forwarded from the total header length identified by the parser in communication 130).

Figure 2:
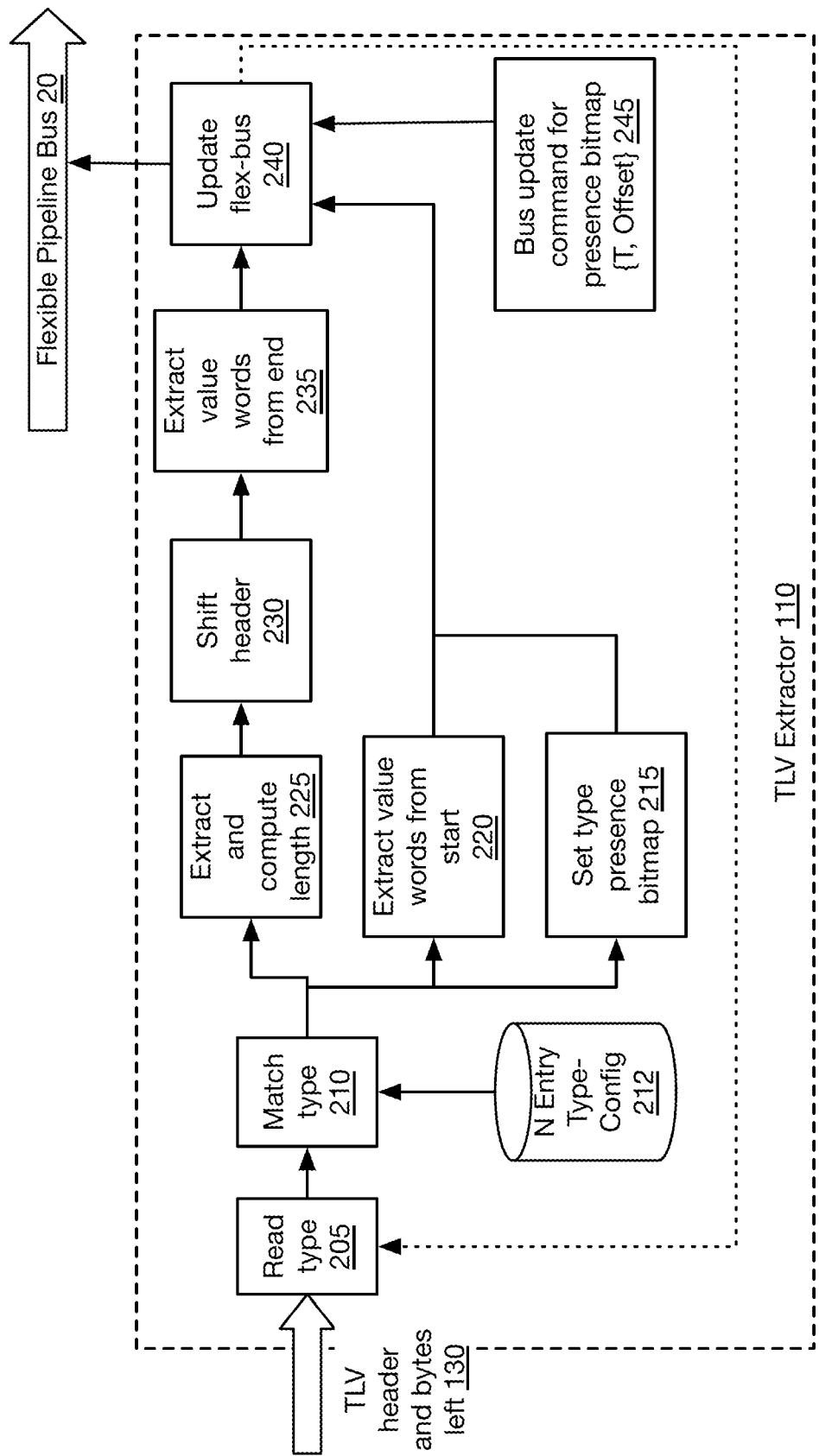
FIG. 2 is a block diagram depicting functional blocks within a flex TLV extractor circuit, according to some implementations.

FIG. 2 is a block diagram depicting functional blocks within a flex TLV extractor circuit, according to some implementations. As discussed above, in many implementations, a TLV extractor 110 may receive a TLV header and a number of bytes in the TLV header 130 (which may be a number of bytes remaining in the header after passing on a portion of the TLV header to another TLV extractor 110, e.g., via a flex bus 20). The TLV extractor 110 may read a type from a first TLV sequence of the received header at block 205, which may comprise extracting a first predetermined number of bits from the TLV sequence (e.g., a first octet, in many implementations, though fewer or greater numbers of bits may be used for type fields in other implementations).

At block 210, the TLV extractor 110 may compare the extracted type bits to type identifiers in memory 212. For example, in many implementations, block 210 may comprise a plurality N of matching circuits, such as content-addressable memory (CAM) circuits or flop-based arrays (or N CAM circuits, in some implementations), with each corresponding to a predetermined type identifier. In some implementations, each array may have a type for which the entry is defined (e.g., a corresponding octet or other such value) such that the input bits may be compared to the stored type bits (e.g., via bitwise AND or similar operations). In some implementations, each array or memory may also store a bit offset and/or a mask for the length field (e.g., identifying the bits associated with the length field for the corresponding type, which may be different for different types of TLV sequences). In some implementations, an array or memory may store a left shift value for the length value which may be used to convert the length value into bytes. In some implementations, an array or memory may store a constant to be added to the length value (e.g., for types with length values that are within a predetermined range or have a minimum value such that a length of "0" is equivalent to a predetermined minimum value such as 32 bits, which may be used to reduce the number of bits required to encode the length field). In some implementations, an array or memory may store a byte offset for the value field in the TLV sequence. Any or all of the above additional data may be provided to subsequent blocks in the TLV extractor 110 to control extraction of data, and/or may be placed in the flex bus entry for the TLV sequence. In some implementations, an array or memory may store an extraction command (e.g., identifying one or more words or octets to extract from the TLV sequence). For example, the extraction command may include an offset value for placing a word or octet in the bus or for extracting the word or octet from the value field of the TLV sequence, and/or may include an identification of a starting or end octet or word (e.g. indicating to extract a first octet or word, or last octet or word, respectively, from the value field of the TLV sequence). For example, in some implementations, a timestamp may be the last 32-bit word in a value field comprising four 32-bit values, and the extraction command may indicate that the last 32-bits of the TLV sequence value field should be placed in the flex bus.

At block 215, the extractor 110 may set a type presence bitmap according to the identified type (e.g., from the matching array). The type presence bitmap may comprise an encoding of the type of the sequence and order within the TLV header of the sequence, in some implementations (e.g., if the TLV header includes a first sequence of type 2, and a second sequence of type 4, the bitmap may encode "2, 4"). In some implementations, the type presence bitmap may comprise a {type, offset} value for the identified type and location within the TLV header of the sequence. For example, as discussed above, in some implementations, the offset may be based on a length of prior TLV sequences, and/or an anchor offset or position within the packet header of the TLV header. Accordingly, in some such implementations, the bitmap may encode a {type, offset} tuple based on a bit position of the TLV sequence within the packet header (including other portions of the header such as source or destination addresses, packet types, etc.). Other encodings are possible in other implementations.

At block 220, in some implementations and in accordance with an extraction command, one or more words or octets may be extracted from the start of a value field of the TLV sequence for placement in the flex bus. Similarly, in some implementations, at block 225, a length of the value field of the TLV sequence may be computed (e.g., based on length bits in the array and any offsets or shifts as discussed above). At block 230, the value field may be shifted (e.g., via a barrel shift or similar bit shift) such that one or more octets or words at the end of the value field may be extracted at block 235 for placement in the flex bus 20.

At block 240, the flex bus may be updated with the extracted value words or octets from the start and/or end of the value field, and/or with the type presence bitmap in accordance with a command from block 245. In many implementations, the blocks of TLV extractor may be pipelined so as to parse the bitstream of the TLV sequence as it is passed through the extractor; the update command may be triggered by completion of processing of the pipeline stages, such that a single bus update command may trigger insertion of the extracted words and type presence bitmap onto the flex bus.

In some implementations, to process successive TLV sequences, blocks 205-245 may be repeated (as shown in dotted line). In other implementations, as discussed above, in many implementations, multiple TLV extractors may be placed in sequence to process successive TLV sequences.

As discussed above, the information placed in the flex bus about the TLV header and sequence types and structures may be used for editing TLV sequences by subsequent TLV processors, without impairing speed or requiring such processors to re-parse or scan the entire TLV header. For example, a TLV processor may identify the presence of a TLV header stack from a packet based on an indication from the flex parser in the flex bus. Using the {type, offset} tuples or other TLV sequence identifiers, a processor may extract a specific TLV sequence from the packet by reading the header bits at the offset. TLV sequences may be modified, reordered, added, or deleted by modifying the TLV presence bitmap, and recomputing the offsets as needed.

Figure 3:
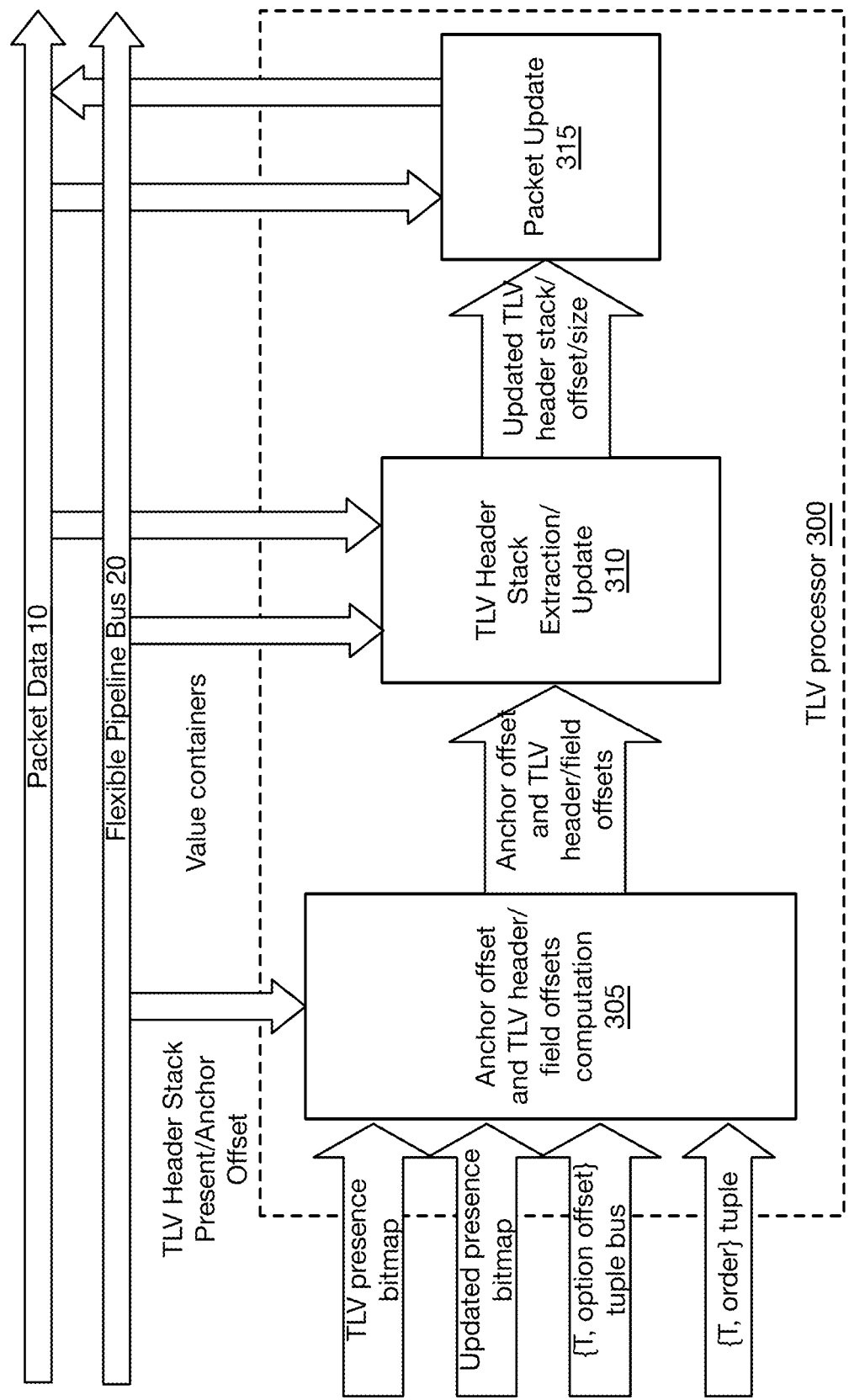
FIG. 3 is a block diagram depicting a flex TLV processor circuit, according to some implementations.

FIG. 3 is a block diagram depicting a flex TLV processor circuit 300, according to some implementations. The TLV processor circuit may read a TLV presence bitmap generated by the TLV parser or extractor as discussed above, and in some implementations, may also read a modified TLV presence bitmap generated by a previous TLV processor in the pipeline. If a TLV sequence tuple or header is identified in the parser or extractor presence bitmap, but not in the updated bitmap, then the TLV sequence may have been deleted by the processor. Conversely, if a TLV sequence is present in the updated bitmap but not in the bitmap from the extractor, then the sequence may have been added by processor. If present in both, the sequence may have been rewritten or modified. Based on the comparison results, the offsets may be recalculated (e.g., updating offsets for tuples after the added, deleted, or rewritten sequence based on the length of that sequence according to the bitmap). For example, given an extractor output bitmap identifying an anchor offset of 20 octets and type/offset tuples of [{A,0}, {C,22},{E,40}] (e.g., indicating that the first TLV sequence starts at octet 20 within the frame after non-TLV header information such as source or destination addresses or at octet 0 within the TLV header; the second TLV sequence starts at octet 42 of the frame or octet 22 of the TLV header; and the third TLV sequence starts at octet 60 of the frame or octet 40 of the TLV header) and an updated bitmap of [{A,0},{C,24},{D,2}], the processor may determine that the first TLV sequence has been written and expanded by two octets, the second TLV sequence has been maintained (or re-written with the same length), and the third TLV sequence has been removed and replaced. In many implementations, the tuple for the newly added TLV sequence (e.g. the {D,2} tuple above) may not have an accurate location offset (or may not include a location offset in some implementations), because the processing stage in the pipeline that added the tuple may not know the proper location offset value, and may just know the order of the TLV sequence within the header. In such implementations, the processor may determine from the comparison of the bitmaps that the sequence has been added and its order within the sequence. The processor may also read type/offset tuples and/or type/order tuples in various implementations. At block 305, the offsets for each TLV sequence may be recomputed accordingly based on prior processing stages, and at block 310, one or more TLV sequences may be extracted from the updated (or original, if not modified) TLV header and added, modified, or deleted as necessary. Value containers, each corresponding to a value of a TLV sequence may be placed on and retrieved from the flex bus 20, allowing for exchange of data between processors 300. For example, as discussed above, a timestamp value may be placed onto the bus 20 for use by other processing stages. The values may be placed in containers, which may include a mask and/or shift value (e.g., for scaling). In some implementations, containers may be allowed to overlap to update the same field with the shift and mask capability.

The updated TLV header stack may be rewritten to the packet at block 315. As discussed above, advantageously, because of the flex TLV implementations discussed herein, each of one or more TLV processors may operate simultaneously on different TLV sequences within the packets as they flow through the packet bus 10 without bottlenecks or delaying throughput by extracting, buffering, and re-inserting the entire packet or TLV header into the bus. This may allow for gigabyte or terabyte throughput, as discussed above.

Figure 4:
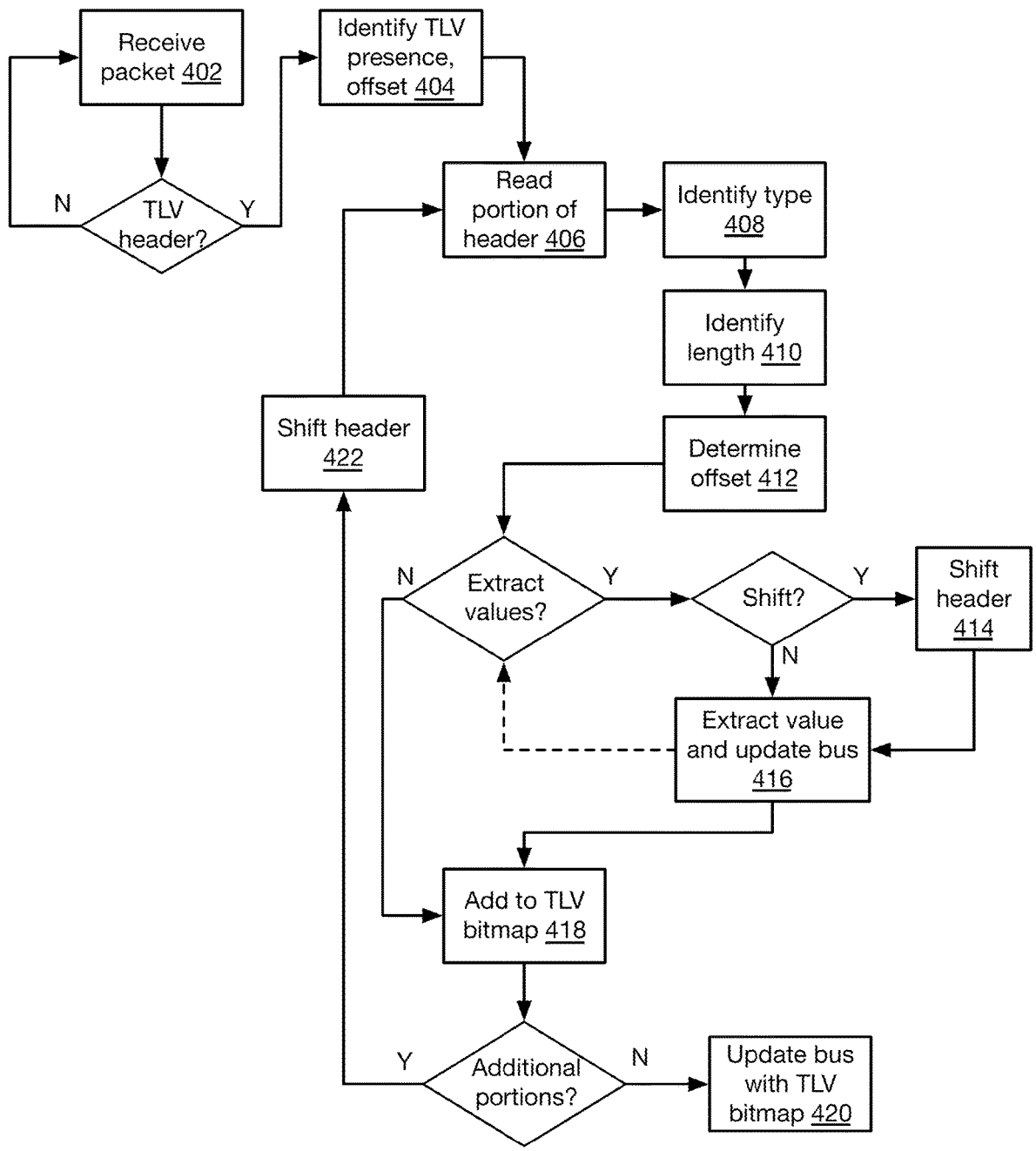
FIG. 4 is a flow chart depicting a method of flex TLV parsing and extraction, according to some implementations.

FIG. 4 is a flow chart depicting a method of flex TLV parsing and extraction, according to some implementations. At step 402, a parser may receive a packet, and determine whether the packet includes a TLV header. Identifying the header may comprise parsing an options field for one or more flags or predetermined bits, identifying a type of the packet, or otherwise identifying whether one or more TLV sequences are included in the header. If so, at step 404, the parser may generate an identifier of the TLV header presence and identify an offset or anchor offset corresponding to the start of the TLV header within the packet or frame.

At step 406, a TLV parser or extractor may read a portion of the TLV header such as a first TLV sequence. At step 408, the TLV parser or extractor may identify a type of the TLV sequence. Identifying the type may comprise matching a type field of the TLV sequence against a plurality of predetermined types, such as via CAM arrays or other memory circuits storing corresponding type identifiers. A matching array may output one or more of a type, bit offset, length mask, length shift, length constant, byte offset for the value field, and/or extraction command, as discussed above. The output may be used to identify a length of the value field of the TLV sequence at step 410. In some implementations, the TLV extractor or parser may calculate a location offset of the TLV sequence based on the anchor offset, lengths or location offsets of any previous TLV sequences, and/or the offsets output by the type matching array.

In some implementations in which the array includes an extraction command, one or more words or octets may be extracted from the start or end of the value field at step 416, with the field being shifted (e.g. via a barrel shift or other such word- or octet-based shift) at step 414 if necessary to extract a value from the end of the value field. The value may be placed on a flex bus and may be placed in a container as discussed above (e.g., along with a mask and/or shift identifier, in some implementations as discussed above). In some implementations, steps 414-416 may be repeated for additional values to be extracted (as shown by dashed line).

At step 418, the TLV sequence may be identified in a TLV presence bitmap, e.g., by adding a tuple of {type, location offset} to the TLV presence bitmap. The bitmap may be placed into a flex bus for use by other TLV extractors and/or TLV processors at step 420. In some implementations in which the TLV parser or extractor is used to parse additional TLV sequences within the header, at step 422, the header may be shifted by an amount based on the identified length of the sequence (e.g., including a length of the type and length fields, as well as the value field), and steps 406-422 may be repeated for additional TLV sequences within the header. In other implementations, additional TLV parsers or extractors may process other TLV sequences in parallel, based on the identifiers of the anchor offset and length or location offset of the prior TLV sequence or sequences placed onto the flex bus by the TLV parser or extractor.

Figure 5:
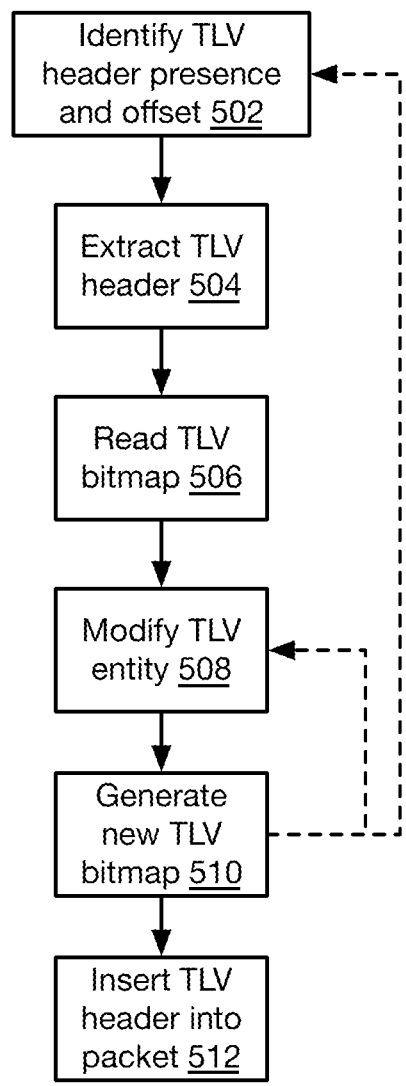
FIG. 5 is a flow chart depicting a method of flex TLV editing, according to some implementations.

FIG. 5 is a flow chart depicting a method of flex TLV editing, according to some implementations. At step 502, a TLV processor may receive or retrieve a TLV presence bitmap from a TLV parser or extractor. In some implementations, the TLV processor may receive or retrieve one or more {type, offset} tuples, e.g., from a flex bus or directly from an upstream parser.

At step 504, in some implementations, the TLV processor may extract a TLV header stack from the packet based on the anchor offset. At step 506, the TLV processor may read the TLV presence bitmap to identify a desired TLV sequence within the TLV header, and at step 508, may modify the TLV sequence and/or header by extracting the TLV sequence from the TLV header of the packet based on the location offset and/or anchor offset associated with the corresponding type identifier in the presence bitmap and modifying the associated value or values; or by deleting or inserting a TLV sequence into the TLV header. In some implementations, values may be retrieved from the flex bus for insertion into a TLV sequence and/or for modifying values in a TLV sequence.

At step 510, the TLV processor may generate a new or modified TLV presence bitmap and may place the bitmap into a flex bus or pass the bitmap to a subsequent processor stage in the pipeline, in some implementations. At step 512, the TLV processor may update the packet by inserting the modified TLV header stack into the packet header.

As discussed above, steps 502-512 may be repeated for additional TLV sequences or headers, and/or may be performed by multiple TLV processors in parallel on different TLV sequences or portions of the TLV header stack. In some implementations (shown in dashed line), steps 508-510 and/or steps 502-510 may be repeated prior to inserting or updating the TLV headers of the packet at step 512. Similarly, in other implementations, any of steps 502-510 may be performed multiple times prior to updating the packet at step 512. In some implementations, the packet may not be updated (e.g., step 512 may be skipped), and the modified TLV sequences may be used elsewhere.

Accordingly, implementations of the systems and methods discussed herein provide a flexible TLV parser and identification map that may be used to quickly identify TLV sequences for subsequent processing in a pipeline. A flexible TLV bus may provide a secondary path for the TLV header and identification map, allowing for subsequent processing stages to read, process, modify, delete, or otherwise utilize individual TLV sequences within the header.

In some aspects, the present disclosure is directed to a method for flexible parsing of type-length-value (TLV) headers of communications packets. The method includes (a) identifying, by a TLV extractor, a presence of a TLV sequence in a header of a communication packet and an anchor offset corresponding to a location of the TLV sequence. The method also includes (b) determining, by the TLV extractor, a type of the TLV sequence. The method also includes (c) calculating, by the TLV extractor, a location offset corresponding to the TLV sequence within the header based on the anchor offset. The method also includes (d) populating, by the TLV extractor, a presence bitmap with the determined type and location offset.

In some implementations, determining a type of the TLV sequence includes providing a first portion of the TLV sequence to each of a plurality of matching circuits, each matching circuit associated with a type of a corresponding plurality of types; and receiving, from a first matching circuit of the plurality of matching circuits, an identification of a matching type. In a further implementation, the plurality of matching circuits comprises a plurality of content-addressable memory circuits.

In some implementations, the TLV sequence is a first TLV sequence of a plurality of TLV sequences, and the method includes advancing the header of the communication packet to a second TLV sequence of the plurality of TLV sequences; and repeating steps (a)-(d) for the second TLV sequence. In a further implementation, calculating the location offset corresponding to the second TLV sequence includes extracting, by the TLV extractor, a length identified in the first TLV sequence; and calculating, by the TLV extractor, the location offset corresponding to the second TLV sequence based on the anchor offset and extracted length of the first TLV sequence. In a still further implementation, advancing the header of the communication packet includes advancing the header by an amount based on the extracted length of the first TLV sequence.

In some implementations, the presence bitmap comprises a plurality of tuples of type and location offsets of a corresponding plurality of TLV sequences in the header of the communication packet. In some implementations, the method includes transmitting the presence bitmap via a bus to a TLV processor. In a further implementation, the method includes extracting at least one word from a value of the TLV sequence and transmitting the extracted at least one word via the bus to the TLV processor.

In another aspect, the present disclosure is directed to a circuit for flexible parsing of type-length-value (TLV) headers of communications packets. The circuit includes a TLV extractor configured to receive a TLV header extracted from a communication packet, and further configured to: (a) identify a presence of a TLV sequence in the TLV header and an anchor offset corresponding to a location of the TLV sequence; (b) determine a type of the TLV sequence; (c) calculate a location offset corresponding to the TLV sequence within the header based on the anchor offset; and (d) populate a presence bitmap with the determined type and location offset.

In some implementations, the TLV extractor further comprises a plurality of matching circuits, each matching circuit associated with a type of a corresponding plurality of types; and a first matching circuit of the plurality of matching circuits is configured to generate an identification of a matching type of the TLV sequence. In a further implementation, the plurality of matching circuits comprises a plurality of content-addressable memory circuits.

In some implementations, the TLV sequence is a first TLV sequence of a plurality of TLV sequences, and the TLV extractor is further configured to: advance the header of the communication packet to a second TLV sequence of the plurality of TLV sequences; and repeat steps (a)-(d) for the second TLV sequence. In a further implementation, the TLV extractor is further configured to calculate the location offset corresponding to the second TLV sequence by extracting a length identified in the first TLV sequence, and calculating the location offset corresponding to the second TLV sequence based on the anchor offset and extracted length of the first TLV sequence. In a still further implementation, the TLV extractor is further configured to advance the header by an amount based on the extracted length of the first TLV sequence.

In some implementations, the presence bitmap comprises a plurality of tuples of type and location offsets of a corresponding plurality of TLV sequences in the header of the communication packet. In some implementations, the TLV extractor is in communication with a TLV processor via a bus and is further configured to transmit the presence bitmap via the bus to the TLV processor. In a further implementation, the TLV extractor is further configured to extract at least one word from a value of the TLV sequence and transmit the extracted at least one word via the bus to the TLV processor.

In still another aspect, the present disclosure is directed to a circuit for modifying type-length-value (TLV) headers of communications packets. The circuit includes a TLV processor in communication with a TLV extractor via a first bus, the TLV processor configured to: receive, from the TLV extractor via the first bus, a presence bitmap comprising a tuple identifying a TLV sequence type in a communication packet received via a second bus, and a location offset of the TLV sequence within the packet; modify the TLV sequence in the communication packet according to the location offset in the presence bitmap; update the presence bitmap according to the modified TLV sequence; transmit, via the first bus, the updated presence bitmap; and transmit, via the second bus, the modified communication packet.

In some implementations, the TLV processor is further configured to modify the TLV sequence by inserting a second TLV sequence in the communication packet and update the presence bitmap with a new location offset of the TLV sequence based on a length of the second TLV sequence.

B. Computing and Network Environment

Figure 6A:
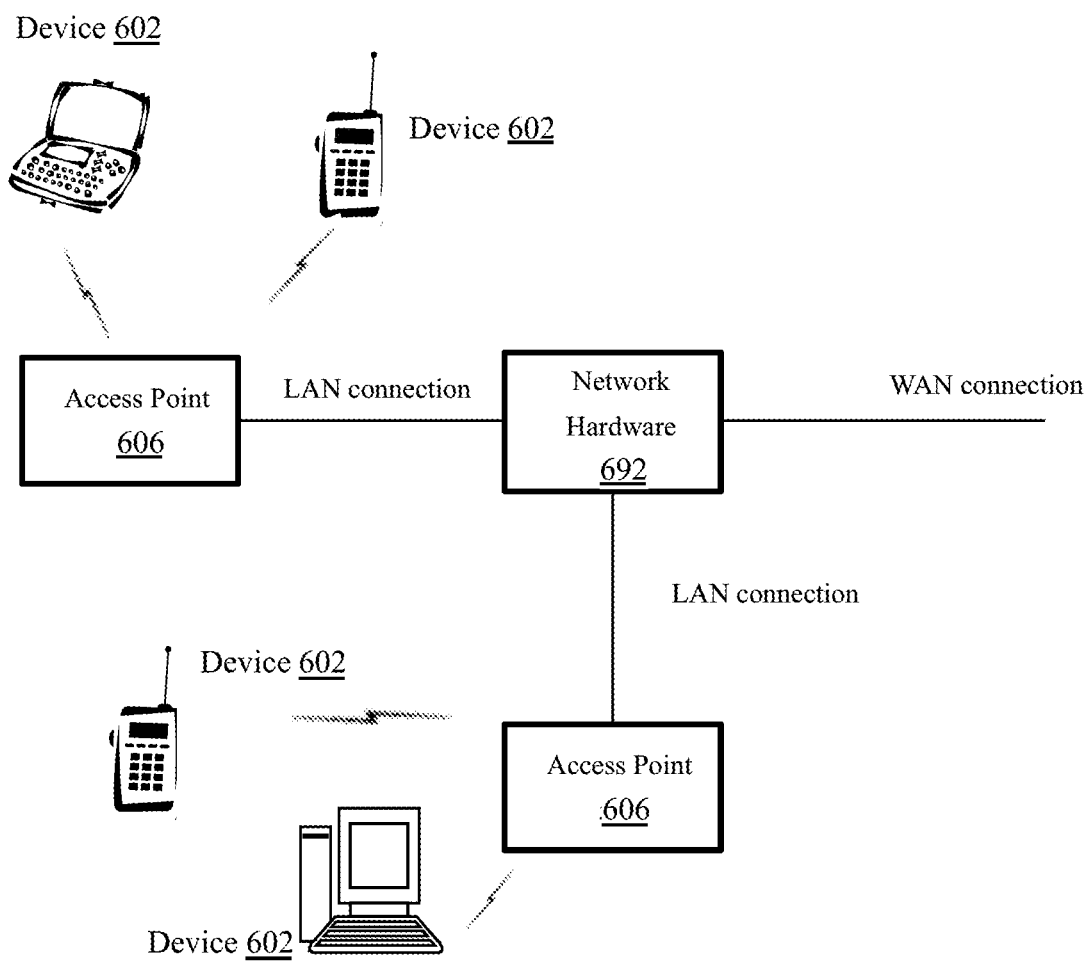
FIG. 6A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 6A, an embodiment of a network environment is depicted. In brief overview, the network environment includes a wireless communication system that includes one or more access points 606, one or more wireless communication devices 602 and a network hardware component 692. The wireless communication devices 602 may for example include laptop computers 602, tablets 602, personal computers 602 and/or cellular telephone devices 602. The details of an embodiment of each wireless communication device and/or access point are described in greater detail with reference to FIGS. 6B and 6C. The network environment can be an ad hoc network environment, an infrastructure wireless network environment, a subnet environment, etc. in one embodiment.

The access points (APs) 606 may be operably coupled to the network hardware 692 via local area network connections. The network hardware 692, which may include a router, gateway, switch, bridge, modem, system controller, appliance, etc., may provide a local area network connection for the communication system. Each of the access points 606 may have an associated antenna or an antenna array to communicate with the wireless communication devices 602 in its area. The wireless communication devices 602 may register with a particular access point 606 to receive services from the communication system (e.g., via a SU-MIMO or MU-MIMO configuration). For direct connections (e.g., point-to-point communications), some wireless communication devices 602 may communicate directly via an allocated channel and communications protocol. Some of the wireless communication devices 602 may be mobile or relatively static with respect to the access point 606.

In some embodiments an access point 606 includes a device or module (including a combination of hardware and software) that allows wireless communication devices 602 to connect to a wired network using Wi-Fi, or other standards. An access point 606 may sometimes be referred to as a wireless access point (WAP). An access point 606 may be configured, designed and/or built for operating in a wireless local area network (WLAN). An access point 606 may connect to a router (e.g., via a wired network) as a standalone device in some embodiments. In other embodiments, an access point can be a component of a router. An access point 606 can provide multiple devices 602 access to a network. An access point 606 may, for example, connect to a wired Ethernet connection and provide wireless connections using radio frequency links for other devices 602 to utilize that wired connection. An access point 606 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 606 may be used for (e.g., in-home or in-building) wireless networks (e.g., IEEE 802.11, Bluetooth, ZigBee, any other type of radio frequency based network protocol and/or variations thereof). Each of the wireless communication devices 602 may include a built-in radio and/or is coupled to a radio. Such wireless communication devices 602 and/or access points 606 may operate in accordance with the various aspects of the disclosure as presented herein to enhance performance, reduce costs and/or size, and/or enhance broadband applications. Each wireless communication devices 602 may have the capacity to function as a client node seeking access to resources (e.g., data, and connection to networked nodes such as servers) via one or more access points 606.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 6B:
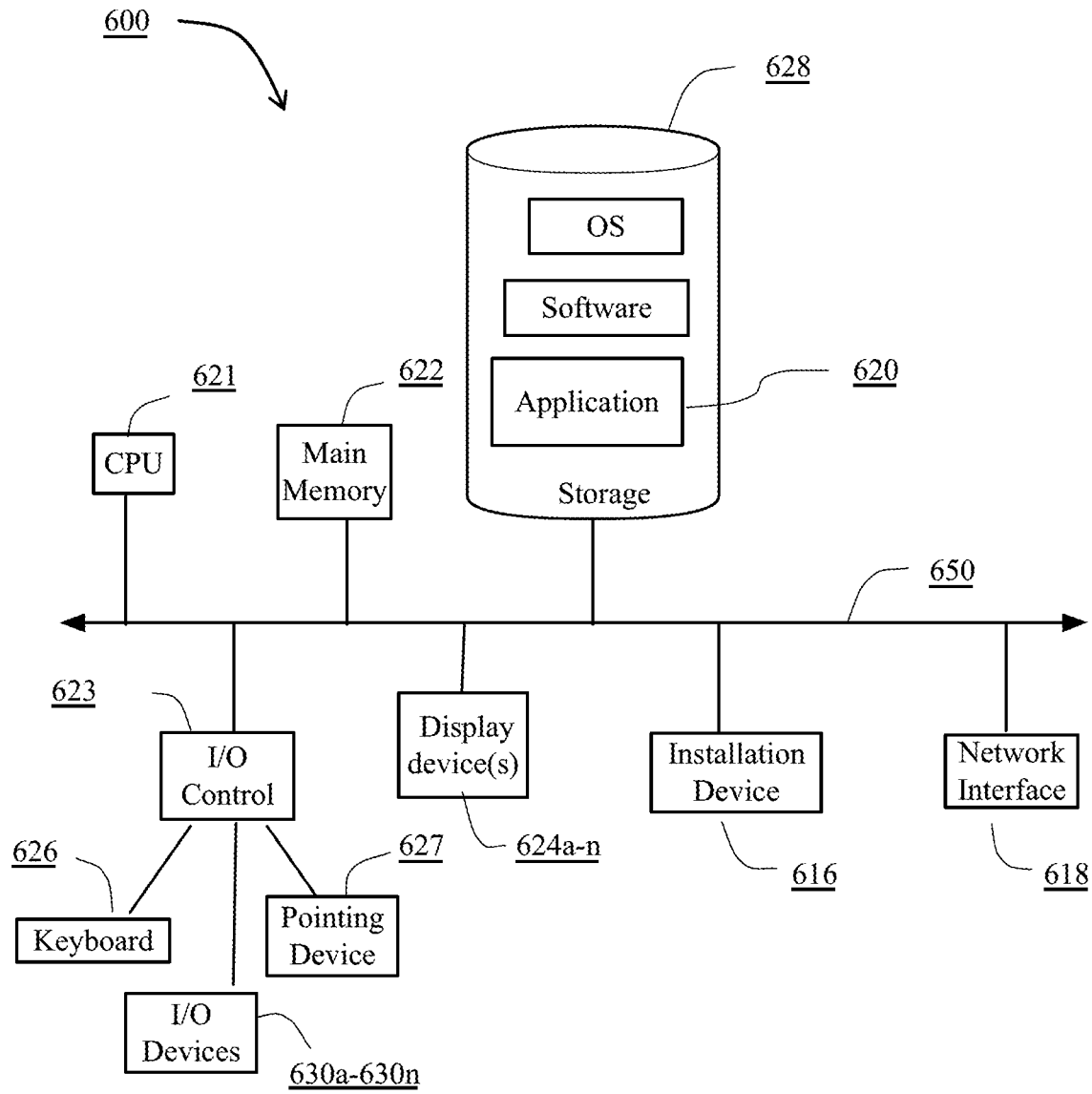
FIGS. 6B and 6C are block diagrams depicting embodiments of computing devices useful in connection with the methods and systems described herein.
Figure 6C:
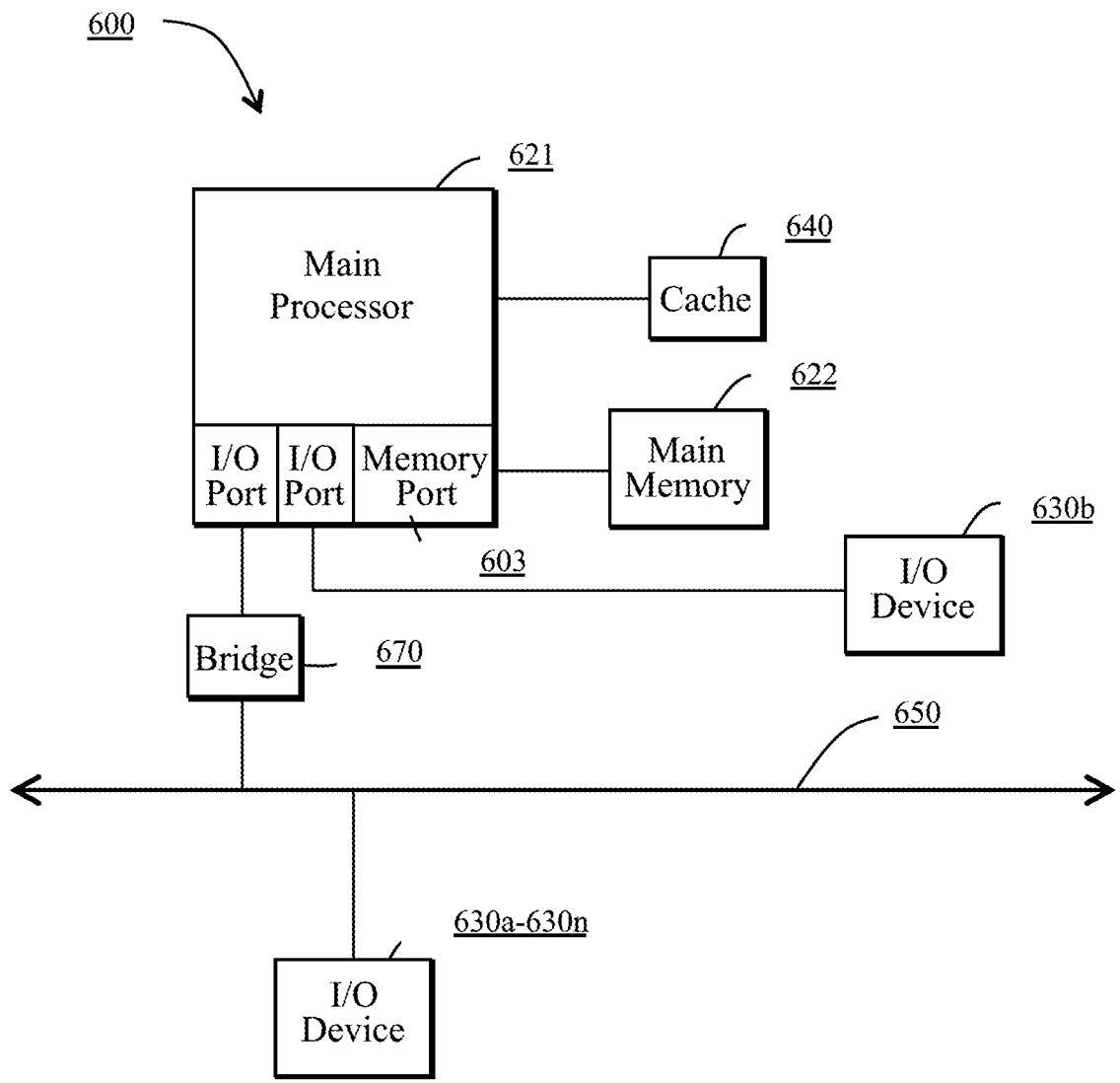

The communications device(s) 602 and access point(s) 606 may be deployed as and/or executed on any type and form of computing device, such as a computer, network device or appliance capable of communicating on any type and form of network and performing the operations described herein. FIGS. 6B and 6C depict block diagrams of a computing device 600 useful for practicing an embodiment of the wireless communication devices 602 or the access point 606. As shown in FIGS. 6B and 6C, each computing device 600 includes a central processing unit 621, and a main memory unit 622. As shown in FIG. 6B, a computing device 600 may include a storage device 628, an installation device 616, a network interface 618, an I/O controller 623, display devices 624a-624n, a keyboard 626 and a pointing device 627, such as a mouse. The storage device 628 may include, without limitation, an operating system and/or software. As shown in FIG. 6C, each computing device 600 may also include additional optional elements, such as a memory port 603, a bridge 670, one or more input/output devices 630a-630n (generally referred to using reference numeral 630), and a cache memory 640 in communication with the central processing unit 621.

The central processing unit 621 is any logic circuitry that responds to, and processes instructions fetched from the main memory unit 622. In many embodiments, the central processing unit 621 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 600 may be based on any of these processors, or any other processor capable of operating as described herein.

Main memory unit 622 may be one or more memory chips capable of storing data and allowing any storage location to be directly accessed by the microprocessor 621, such as any type or variant of Static random access memory (SRAM), Dynamic random access memory (DRAM), Ferroelectric RAM (FRAM), NAND Flash, NOR Flash and Solid State Drives (SSD). The main memory 622 may be based on any of the above-described memory chips, or any other available memory chips capable of operating as described herein. In the embodiment shown in FIG. 6B, the processor 621 communicates with main memory 622 via a system bus 650 (described in more detail below). FIG. 6C depicts an embodiment of a computing device 600 in which the processor communicates directly with main memory 622 via a memory port 603. For example, in FIG. 6C the main memory 622 may be DRDRAM.

FIG. 6C depicts an embodiment in which the main processor 621 communicates directly with cache memory 640 via a secondary bus, sometimes referred to as a backside bus. In other embodiments, the main processor 621 communicates with cache memory 640 using the system bus 650. Cache memory 640 typically has a faster response time than main memory 622 and is provided by, for example, SRAM, BSRAM, or EDRAM. In the embodiment shown in FIG. 6C, the processor 621 communicates with various I/O devices 630 via a local system bus 650. Various buses may be used to connect the central processing unit 621 to any of the I/O devices 630, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 624, the processor 621 may use an Advanced Graphics Port (AGP) to communicate with the display 624. FIG. 6C depicts an embodiment of a computer 600 in which the main processor 621 may communicate directly with I/O device 630b, for example via HYPERTRANSPORT, RAPIDIO, or INFINIBAND communications technology. FIG. 6C also depicts an embodiment in which local busses and direct communication are mixed: the processor 621 communicates with I/O device 630a using a local interconnect bus while communicating with I/O device 630b directly.

A wide variety of I/O devices 630a-630n may be present in the computing device 600. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 623 as shown in FIG. 6B. The I/O controller may control one or more I/O devices such as a keyboard 626 and a pointing device 627, e.g., a mouse or optical pen. Furthermore, an I/O device may also provide storage and/or an installation medium 616 for the computing device 600. In still other embodiments, the computing device 600 may provide USB connections (not shown) to receive handheld USB storage devices such as the USB Flash Drive line of devices manufactured by Twintech Industry, Inc. of Los Alamitos, California.

Referring again to FIG. 6B, the computing device 600 may support any suitable installation device 616, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 600 may further include a storage device, such as one or more hard disk drives or redundant arrays of independent disks, for storing an operating system and other related software, and for storing application software programs such as any program or software 620 for implementing (e.g., configured and/or designed for) the systems and methods described herein. Optionally, any of the installation devices 616 could also be used as the storage device. Additionally, the operating system and the software can be run from a bootable medium.

Furthermore, the computing device 600 may include a network interface 618 to interface to the network 604 through a variety of connections including, but not limited to, standard telephone lines, LAN or WAN links (e.g., 802.11, Ti, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 600 communicates with other computing devices 600' via any type and/or form of gateway or tunneling protocol such as Secure Socket Layer (SSL) or Transport Layer Security (TLS). The network interface 618 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

In some embodiments, the computing device 600 may include or be connected to one or more display devices 624a-624n. As such, any of the I/O devices 630a-630n and/or the I/O controller 623 may include any type and/or form of suitable hardware, software, or combination of hardware and software to support, enable or provide for the connection and use of the display device(s) 624a-624n by the computing device 600. For example, the computing device 600 may include any type and/or form of video adapter, video card, driver, and/or library to interface, communicate, connect or otherwise use the display device(s) 624a-624n. In one embodiment, a video adapter may include multiple connectors to interface to the display device(s) 624a-624n. In other embodiments, the computing device 600 may include multiple video adapters, with each video adapter connected to the display device(s) 624a-624n. In some embodiments, any portion of the operating system of the computing device 600 may be configured for using multiple displays 624a-624n. One ordinarily skilled in the art will recognize and appreciate the various ways and embodiments that a computing device 600 may be configured to have one or more display devices 624a-624n.

In further embodiments, an I/O device 630 may be a bridge between the system bus 650 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 600 of the sort depicted in FIGS. 6B and 6C may operate under the control of an operating system, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 600 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 600 has sufficient processor power and memory capacity to perform the operations described herein.

In some embodiments, the computing device 600 may have different processors, operating systems, and input devices consistent with the device. For example, in one embodiment, the computing device 600 is a smart phone, mobile device, tablet or personal digital assistant. In still other embodiments, the computing device 600 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

We claim:
1. A method comprising:
identifying, by a type-length-value (TLV) processor of a device, a type of a TLV sequence of one or more TLV sequences present in a header of a packet and a starting location of the header, the packet received via communications over one or more networks;
determining, by the TLV processor, an offset of a location of the TLV sequence in the header based at least on the starting location;
encoding, by the TLV processor, the TLV sequence in a bitmap using the type and offset; and
providing, by the TLV processor, the bitmap for use by another TLV processor to identify the TLV sequence in the header.

2. The method of claim 1, further comprising receiving, by the TLV processor, the packet from a packet data bus.

3. The method of claim 1, further comprising determining, by the TLV processor, that the TLV sequence is present in the TLV header of the packet, wherein the TLV header is configured at a layer in a network stack of the device having a network interface to receive the packet via the one or more networks.

4. The method of claim 1, further comprising generating, by the TLV processor, the bitmap to identify the one or more TLV sequences within the header.

5. The method of claim 1, further comprising encoding, by the TLV processor, the TLV sequence in the bitmap using a tuple comprising at least the type and the offset.

6. The method of claim 1, wherein the TLV processor comprises a packet processing engine configured on one or more processors.

7. The method of claim 1, wherein the TLV processor comprises circuitry.

8. The method of claim 1, further comprising placing, by the TLV processor, the bitmap on a flex bus for another TLV processor to use.

9. A system comprising:
a device configured with a type-length-value (TLV) processor, the device having a network interface configured to receive one or more packets via communications over one or more networks;
the TLV processor configured to:
identify a type of a TLV sequence of one or more TLV sequences present in a header of a packet and a starting location of the header;
determine an offset of a location of the TLV sequence in the header based at least on the starting location;
encode the TLV sequence in a bitmap using the type and offset; and
communicate the bitmap on a bus for use by another TLV processor to identify the TLV sequence in the header.

10. The system of claim 9, wherein the TLV processor is further configured to receive the packet from a packet data bus.

11. The system of claim 9, wherein the TLV processor is further configured to determine that the TLV sequence is present in the TLV header of the packet, wherein the TLV header is configured at a layer in a network stack of the device having a network interface to receive the packet via the one or more networks.

12. The system of claim 9, wherein the TLV processor is further configured to generate the bitmap to encode the one or more TLV sequences within the header.

13. The system of claim 9, wherein the TLV processor is further configured to encode the TLV sequence in the bitmap using a tuple comprising at least the type and the offset.

14. The system of claim 9, wherein the TLV processor comprises a packet processing engine configured on one or more processors.

15. The system of claim 9, wherein the TLV processor comprises circuitry.

16. A device comprising:
circuitry providing a type-length-value (TLV) circuit;
the TLV circuit configured to:
identify a type of a TLV sequence of one or more TLV sequences present in a header of a packet and a starting location of the header;
determine an offset of a location of the TLV sequence in the header based at least on the starting location;
encode the TLV sequence in a bitmap using the type and offset; and
place the bitmap on a bus for use by another TLV circuit to identify the TLV sequence in the header.

17. The device of claim 16, wherein the TLV circuit is further configured to receive the packet from a packet data bus.

18. The device of claim 16, wherein the TLV circuit is further configured to determine that the TLV sequence is present in the TLV header of the packet.

19. The device of claim 16, wherein the TLV circuit is further configured to generate the bitmap and encode the TLV sequence in the bitmap using a tuple comprising at least the type and the offset.

20. The device of claim 16, wherein the TLV circuit and the another TLV circuit is electrically coupled to the bus.

* * * * *